May 25, 1937. G. D. ATWOOD 2,081,418
SPOOL
Filed July 3, 1934
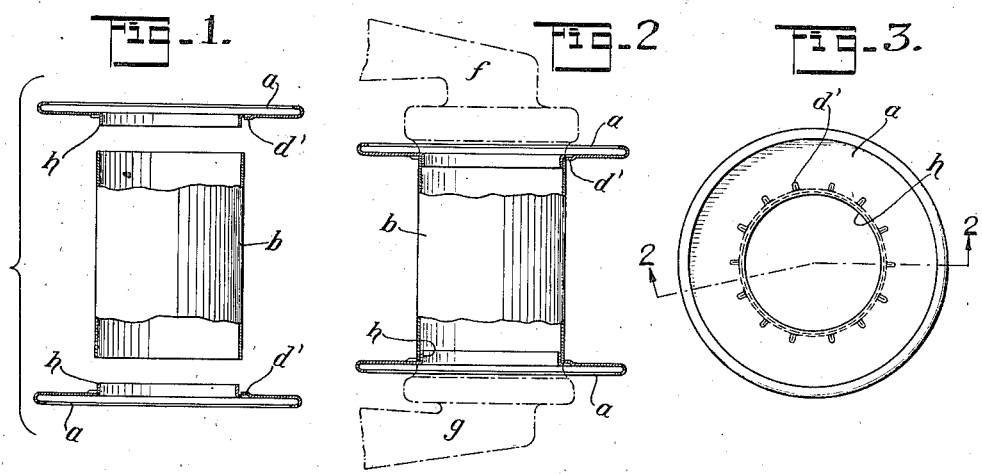

Patented May 25, 1937

2,081,418

UNITED STATES PATENT OFFICE 2,081,418

SPOOL

George D. Atwood, Brooklyn, N. Y.

Application July 3, 1934, Serial No. 733,561

2 Claims. (Cl. 242—123)

This invention relates to improvements in sheet metal flanged spools for the reception of thread-like material such as silk, rayon, etc., and for the reception of tape-like material, including surgical tape.

As to thread, the spool provided by the present invention is, like that of my Letters Patent No. 1,744,606, one on which the thread may be wound without danger of being caught between the flanges and spool barrel and breaking in winding and other operations.

As to surgical tape, the spool provided by the present invention is, in one of the embodiments thereof, like that of my Letters Patent No. 1,853,029, one in which the tape wound upon the spool barrel, flush with the ends thereof and maintained out of contact with and consequent discoloration or contamination by the spool flanges.

The spool provided by the present invention has but three members (barrel and end flanges) and is one which may be manufactured at low cost so that the price charged therefor may be so low that after use the spools may be thrown away without serious loss, if any, to the user.

To the foregoing it should be added that the spool provided by the present invention is one in which the three members thereof (barrel and end flanges) are welded together, preferably consisting of or including spot-welding, the union between the three members being such as to prevent the entrance of thread between them, for example, and in addition to this, also simplifying and thereby reducing the cost of manufacture of the spool.

In the accompanying drawing—

Figure 1 is a side view of the three members of a spool (the barrel and flanges) embodying the present invention preliminary to their assemblage and welding together.

Figure 2 is a side view thereof, partly in section, with the barrel and flanges welded together, the sectional views of the end flanges being taken on the line 2—2 of Figure 3;

Figure 3 is a plan or end view of the spool of Figure 2.

Referring to said drawing, $a$ indicates the flanges and $b$ the barrel of the spool, these three members, which are of sheet metal, being united by both surface- and spot-welding, as hereinafter shown. The flanges are provided on their inner faces with projections $d'$ extending radially outward from the barrel and distanced from the surface of the latter so that when the barrel and flanges are assembled together the ends of the barrel will engage the inner surfaces of the flanges inside these projections, with its sides also in engagement with the latter. The barrel and flanges when assembled together, as shown in Figure 2, are then spot-welded and surface-welded together through the ends of the barrel and the inner surfaces of the flanges and the sides of the barrel and the projections $d'$ by the use of electrical conducting clamps $f$, $g$, as shown in Figure 2. Each spool flange is provided on its inner face with a dependent annular flange $h$, which, when the barrel and flanges are assembled, will enter the ends of the barrel. The outer diameter of these flanges $h$ is about equal to the inner diameter of the barrel so as to fit snugly therein and thus serve to properly position the spool flanges assembled on the barrel ends and to also reinforce or strengthen the spool at its welded joints.

It will be observed from the foregoing that, when the spool is used for winding of thread, for example, the welding between the flanges $a$, projections $d'$ and the ends of the barrel $b$ is such as to preclude the entrance of threads between the barrel and flanges and to therefore avoid the catching of threads between these members and consequent breakage of the threads on unwinding.

What I claim is:

1. A sheet metal spool comprising a barrel on which material is to be wound, and spool flanges welded at their inner faces to the ends of the barrel and provided with a plurality of struck-up projections extending inwardly beyond the inner faces of the flanges and radially from and welded to the sides of the barrel.

2. A sheet metal spool comprising a barrel on which material is to be wound, and spool flanges welded at their inner faces to the ends of the barrel and provided with a plurality of struck-up projections extending inwardly beyond the inner faces of the flanges and radially from and welded to the sides of the barrel, the flanges being provided with depending means entering and engaging the inner walls of the barrel.

GEORGE D. ATWOOD.